(12) United States Patent
Mueller-Fiedler et al.

(10) Patent No.: US 6,400,483 B1
(45) Date of Patent: Jun. 4, 2002

(54) OPTICAL SIGNAL TRANSMISSION WITH THERMOOPTICALLY CONTROLLED OPTICAL SWITCHING

(75) Inventors: Roland Mueller-Fiedler, Leonberg; Klaus-Michael Mayer, Ditzingen; Wolf-Henning Rech, Leonberg; Gerd Muehlnikel, Backnang, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/261,516

(22) Filed: Mar. 2, 1999

(30) Foreign Application Priority Data

Mar. 7, 1998 (DE) .......................................... 198 09 887

(51) Int. Cl.$^7$ ............................................... H04B 10/12
(52) U.S. Cl. .......................... 359/188; 359/139; 385/14
(58) Field of Search ................................. 359/188, 139; 385/14, 16

(56) References Cited

U.S. PATENT DOCUMENTS

| | | | | |
|---|---|---|---|---|
| 5,117,470 A | * | 5/1992 | Inoue et al. | 385/14 |
| 5,623,566 A | * | 4/1997 | Lee et al. | 385/24 |
| 5,699,465 A | * | 12/1997 | Nakaya | 385/41 |
| 6,084,050 A | * | 7/2000 | Ooba et al. | 528/42 |

OTHER PUBLICATIONS

"Digital Optical Switch", Y. Silberger et al, Appl. Phys. Lett. 51 (16), Oct. 19, 1987, pp. 1230–1232.

Mats Gustavsson et al: "Network Requirements on Optical Switching Devices", Proceedings ECIO'97, Stockholm, pp. 10/JWA4–1 to JWA4–6/15.

R. Moosburger et al: "A Novel Polymer Digital Optical Switch With High Temperature Stability", Proc 21–st Eur. Conf. on Comm. (ECOC'95)–Brussels, Th. L. 3.5, pp. 1063–1066.

A Neyer et al: "High–Speed Cutoff Modulator Using A TI–Diffused Linbo Channel Waveguide", Appl. Phys. Lett. 35, pp. 256–258(1979).

W. Bernhard Und W.–H. Rech: "Optischer Wellenleiterschalter" (patent application).

* cited by examiner

Primary Examiner—Leslie Pascal
Assistant Examiner—Christina Y. Leung
(74) Attorney, Agent, or Firm—Michael J. Striker

(57) ABSTRACT

The optical signal transmission system includes one or more optical wave guide switches (11 to 15) for switching between transmission paths for transmission of light signals and an optical level adjusting device (16 to 24) connected with the one or more optical wave guide switches in at least one of the transmission paths. The optical level adjusting device (16 to 24) controls its own light transmittance with a thermooptic device (22,24) and the one or more optical wave guide switches (11 to 15) switch between transmission paths by a similar thermooptic device (14,15). The one or more optical wave guide switches and the optical level adjusting device are arranged in an integrated thermooptic circuit in a common substrate.

6 Claims, 1 Drawing Sheet

OPTICAL SIGNAL TRANSMISSION WITH THERMOOPTICALLY CONTROLLED OPTICAL SWITCHING

BACKGROUND OF THE INVENTION

The present invention relates to an optical signal transmission system and, more particularly, to an optical signal transmission system comprising an optical transmission line with at least one optical wave guide switch and an optical level adjuster.

Switching matrices are required in fiber optic systems, especially information transmission system, for switching between respective input and output wave guides. The optical cross-connect that combines the switching matrix with optical amplifiers for level regulation and/or transponders for wavelength conversion and/or WDM-components for wavelength separation is an especially important application for this type of switching circuit. In a complex cross-connect of this type level regulation means, which comprise a power measuring device arranged in the vicinity of the output optical fiber (by diverting a fixed part of the light power conducted in the output fiber to a photodetector) and one or more level adjusting devices, is an absolute necessity. The required quality, for example a guaranteed maximum error rate, of the data flow over several cascaded transmission paths and through several network junctions is only guaranteed by this type of level regulation in the larger photonic networks.

The level adjusting device should be controllable with electrical parameters (a voltage or a current level) and has at least one adjusting speed corresponding to the switching speed of the switching matrix. Its minimum insertion attenuation should be small, the adjusting range should be sufficient for compensation of different input levels and different insertion attenuation of the components in the switched paths, typically from 10 to 20 dB being required.

In the following the state of the art for the optical switch and then for the optical level adjuster or adjusting device is described.

Switches that can switch the path of light conducted in wave guide/glass fibers are required in fiber optic systems for special communication systems. This type of switch typically has one or more input wave guides and one or more output wave guides that are connected with each other by a switching matrix. The switching matrix causes a coupling of an input with a particular output wave guide (Proceedings ECIO'97, Stockholm, pp. 10/JWA4-1 to JWA4-6/15, Mats Gustavsson, et al: "Network Requirements on Optical Switching Devices").

Primarily it is desired that as much of the light from the input wave guide is coupled as completely as possible into the selected output wave guide (high transmission=reduced insertion attenuation) and all other output wave guides receive a greatly reduced proportion of the light in the input wave guide (reduced cross talk=high cross talk damping). That should be possible in the wide optical wave length range used for telecommunications purposes, typically from 1.2 to 1.6 $\mu$m. Conventional specifications for an optical switching matrix used in telecommunications networks include insertion attenuation of less than 5 to less than 10 dB and cross talk attenuation of greater than 30 to greater than 60 dB.

Optical switches are embodied in a variety of technologies and have different switching principles.

Relay type switches shift a glass fiber in front of an array of opposing glass fibers so that a coupling between two fibers occurs with a precise alignment. Insertion attenuation and cross talk attenuation are outstanding, however the switching time is comparatively long and the manufacturing expense is great. The same goes for those switches that broaden the light from each glass fiber by collimated optics and then make a changeable optical coupling between different fibers with rotated or shifted mirrors, prisms and/or movable lenses.

Several switching principles are known for integrated optic circuits that operate entirely with wave guides.

Either the light of an input fiber is divided into several paths with a passive power divider and a switchable optical amplifier which has a high damping in the switched-out case and compensates for the loss in light distribution (active) in the switched-on case is inserted in each path. This amplifier together with a passive power divider can be manufactured in a semiconductor base (Semiconductor Laser Amplifier, SLA). The amplification process (based on induced emission) is generally a narrow bandwidth amplification and thus limited to a narrow wavelength range. Furthermore since the optical amplifier noise causes interference at high input powers, which is polarization dependent in its properties for the typical wave guide in a semiconductor substrate, the embodiments for the interesting wavelength range (1.2 to 1.6 $\mu$m) must be constructed using the very expensive InP semiconductors.

In contrast a purely passive integrated optic wave guide switch operates by modification of the index of refraction distribution in the vicinity of the coupling points of wave guides. Either interferometric devices, for example a Mach-Zehnder interferometer (MZI) with two inputs and two outputs in which the coupling between inputs and outputs can be changed by changing the index of refraction (transit time, phase) in one or both arms, or X- or Y-branching devices with reduced opening angle, can be used for the switch so that the light is conducted into one of two outputs. The latter type of device has the advantage that the switching operation is guaranteed over a wide range of refraction changes (the so-called "digital optical switch", DOS), while the index of refraction must be very precisely changed in the MZI switch.

A temperature change can be used as a mechanism for index of refraction changes (Proc. $21^{st}$ Eur. Conf. On Comm. (ECOC'95-Brussels, Th.L.3.5,pp. 1063 to 1066,R. Moosburger, et al: "A novel polymer digital optical switch with high temperature stability"). The wave guide material must have a high thermooptic coefficient (TO); typically organic materials (polymers, among others plastic materials) can be used. The switching time should be in the range of 1 ms, and the switching properties should be independent of light polarization. Instead of that the electrooptic effect (EO) which causes a index of refraction change under strong electric field in certain materials can be used (Y. Silberberg, et al, "Digital Optical Switch", Appl. Phys. Lett. 51 (16) Oct. 19, 1987, pp. 1230 to 1232); here the switching time is very short (ps time scale), however the effect is different according to the light polarization. Furthermore materials with a high electrooptic effect, for example $LiNbO_3$ are expensive.

Another switching principle is used in thermooptic digital optical switches (TO-DOS). According to FIG. 1 of the accompanying drawing wave guides 6 are in the polymer layers 3,4,5 provided in the silicon substrate 2. One known embodiment is the strip wave guide in a three layer system; however other optical configurations are conceivable. Heating conductors 7 that increase the temperature in the vicinity of the wave guides 6 and thus lower the index of index of refraction in that material are provided in the vicinity of the wave guides 6 over the wave guides 6, which means opposite to the silicon substrate 2 serving as heat sink. Typical index of refraction differences for the wave guide core-substrate are $5\times10^{-1}$, while the thermooptic coefficient is typically about $10^{-4}$ $K^{-1}$. Thus a temperature increase of 50 K in the wave guide core is sufficient to cut off the light conduction. A reduced temperature difference between both wave guide outlets of about 20 K is enough for switching in a gradually opening Y branch device. Thus the desired coupling over of the light into a particular one of the outputs is the more complete, the less the opening angle of the Y branching device is; because of that the component length of the wave guide switch increases. Since the plastic materials used have high thermooptic coefficients, however also even with reduced optical absorption, an increased component length leads to higher insertion attenuation. Furthermore the Y branch itself produces an additional attenuation in contrast to a simple straight or curved wave guide, since the distribution of the input wave guide section into the output section cannot be accomplished perfectly in the vicinity of the "branch point" of the "Y". The cross talk damping or attenuation attainable with this type of TO-DOS device is in a range of from 20 to 25 dB and is thus insufficient. Thus frequently two DOS switches are cascaded for a switching stage in order, because of that, to increase the cross talk attenuation so that it is greater than 40 dB. This procedure however clearly increases the insertion attenuation.

Besides the 1×2-Y-TO-DOS switch also a 1×3 switch is known according to the same principle. Larger switching matrices, for example 4×4, 8×8 or 1×16, can also be built by cascading these basic elements.

In a parallel patent application "Optical Wave guide Switches" (Inventors: Winfried Bernard and Wolf-Henning Rech) an additional modulator for influencing the index of refraction is provided in an optical wave guide switch with an optical wave guide formed with a Y branch and devices arranged in it for causing local changes in the index of refraction in the output arms of the Y branch. This additional modulator is controlled so that the increased damping or attenuation obtained in one output arm by one of the devices is complemented by an increased modulation attenuation.

Of the integrated optical switches thermooptic switches best fit the specification of optical cross-connect systems.

Optical level adjusting devices chiefly comprise a glass substrate provided with vapor-deposited metallic reflection layers in which the reflection degree can be changed by variation of the layer thickness along a linear or circumferential coordinate of a rectangular or circular substrate. This "grey wedge" is then inserted in the light path. By shifting or rotating the reflection degree can be changed and thus the remaining transmission can be changed. A precise electrical control is possible with a displacement sensor having an electrical drive means. In order to guarantee a reduction in the attenuation, the optical beam diameter must be considerably widened in the vicinity of the inserted attenuation plate in relation to that of the glass fiber so that additional lenses or lens-like media must be built in for beam transformation. All these components must be precisely adjusted. This type of level adjusting device is used as a precisely calibrated attenuation device, especially in light wave guide measuring technology, however it is too expensive for use in an optical cross-connect.

Another form for an optical level adjusting device comprises an integrated optical Mach-Zehnder interferometer which couples a portion of the light conducted through it into the wave guide substrate during tuning. Basically a thermooptically tunable symmetric or asymmetric Y branch device designed as a variable attenuation component would be suitable as a digital optical switch, when it is operated in an "analog" range in the center between ends of the switch characteristic curve. This characteristic curve is very steep and has hystereses in part that make it unsuitable for use as a level adjusting device.

Finally the decoupling of light can occur directly in the substrate without additional wave guide elements or structures, if the index of refraction gradient can be made large enough so that the substrate index of refraction can be adjusted in the optical field in the immediate vicinity of the wave guide core which is higher than the core index of refraction and, because of that, a "tunneling" of a portion of the light guided into the substrate is possible. This type of "cut-off modulator", of course with electrooptic instead of thermooptic tuning, was described in A. Neyer, W. Sohler, Appl. Phys. Lett. 35, 256 to 258 (1979).

SUMMARY OF THE INVENTION

It is an object of the present invention to provide an optical signal transmission system having an optical wave guide switch and an optical level controller of the above-described type that is improved in relation to the prior art optical signal transmission systems.

The heart of the invention, i.e. its essential feature, is the combination of a thermooptically controlled wave guide switching matrix with a thermooptically controllable level adjusting device in a common integrated optic circuit.

The special advantages of the invention result from the fact that switching matrices and level adjusting devices are continuously jointly required in important application involving optical cross-connects, and that both structural elements are technologically compatible, when both structural elements are based on the especially desirable thermooptic control principle.

The realization of a common integrated optic circuit for a switching matrix (or partial switching matrix) and one or more level adjusting devices requires no additional manufacturing expense, since the process steps and their number and sequence are identical for both devices. The integration only requires a system of lithographic masks for making the wave guide and the heating conductor which provide both components in a series circuit in a common substrate.

The optical signal transmission system according to the invention benefits from the known advantages resulting from integration including a reduced component size that can be significant with large switching matrices with many inputs and outputs and reduced manufacturing costs since all process steps must be performed only once in the manufacturing of the device that result from integration. However it also has additional advantages, namely that the expensive, highly precise coupling of the glass fibers to the integrated optic circuit is necessary only once and only a single housing with the required electrical contacts is necessary. Furthermore the integration of the invention has an additional advantage, namely that the entire insertion attenuation of the series circuit comprising the switching matrix and the level adjusting device is reduced in the integrated structure in comparison to the same structure provided in two separate components connected by glass fibers presently used in the state of the art, since each coupling location between the glass fiber and the integrated optic circuit produces unavoidable transmission losses. Finally the reliability of the entire cross-connect is increased when it includes fewer components and connection locations.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
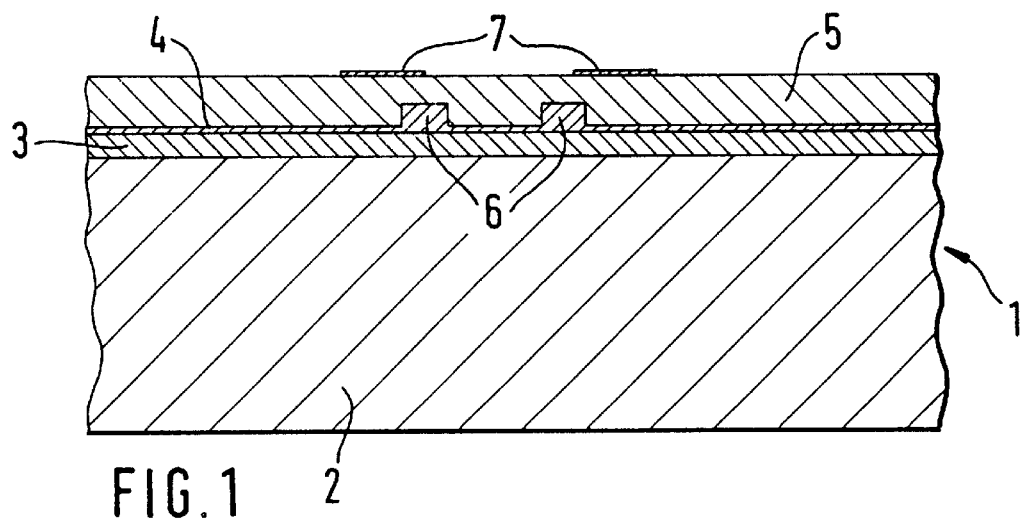
FIG. 1 is a schematic cross-sectional view through a component for general integrated thermooptic operations.

FIG. 1 shows one example of a component 1 for integrated thermooptic operation. A substrate 2, for example made from silicon or glass, has several layers of optically transparent materials, of which at least one has a comparatively large thermooptic coefficient (which means that the index of refraction depends strongly on temperature). Usually organic materials, especially polymers, are materials with a high thermooptic coefficient. Polymers with a high degree of optical transparency and a large thermooptic coefficient are known. One of the layers is laterally structured, whereby one or more optical wave guides are produced with suitable structure (geometry and index of refraction). Which type of wave guide that is used is unimportant for the invention. A three layer system including layers 3 to 5 is shown in the drawing, in which the central layer 4 has a higher index of index of refraction and thus forms a ribbed wave guide 6. A heating conductor 7 that can produce heat and thus a temperature gradient and a index of refraction gradient when current flows through it is provided in the vicinity of this wave guide 6. When current flows through one or the other heating conductor 7, the index of refraction profile in the surroundings of one or more wave guides 6 changes, whereby the optical field distribution and the effective index of refraction of light traveling through the wave guide can be changed.

Figure 2:
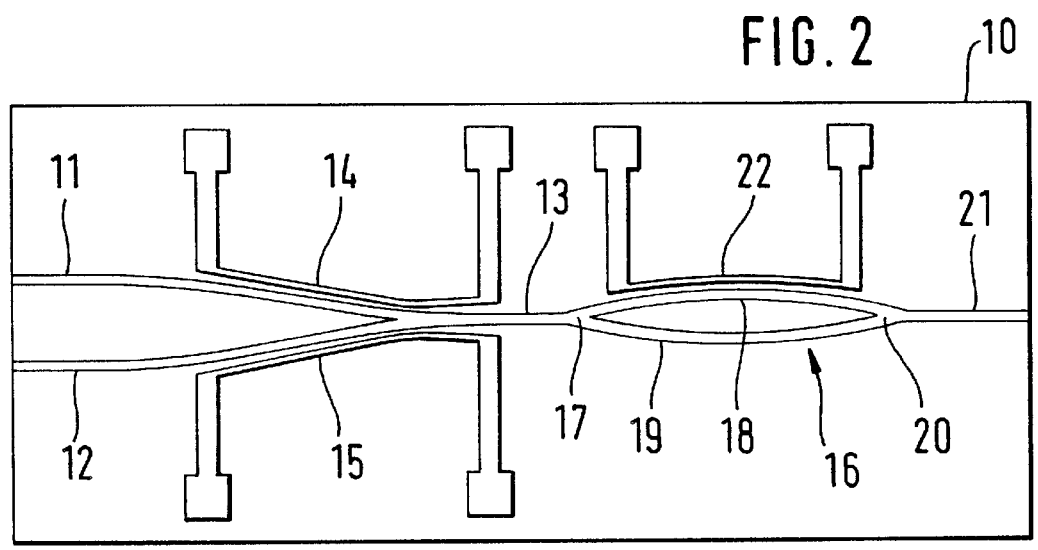
FIG. 2 is a diagrammatic representation of a first embodiment of the invention.

FIG. 2 shows a first preferred embodiment of the invention. The sketched switching matrix 10 comprises in this embodiment a simple 2×1 wave guide switch operating according to the principles of digital optical switching which passes light from one of the input wave guides 11 and 12 into an intermediate wave guide 13. Also the heating conductors 14 and 15 are provided, which are operated alternately. In a material with a negative thermooptic coefficient the heater 14 must be supplied with current so that light can travel along the light path 12–13 while the heater 15 must be provided with current so that light can travel along the light path 11–13. A thermooptically tunable Mach-Zehnder interferometer 16 that operates as a level adjusting device is provided in this same substrate. An entrance portion 17 of the interferometer 16 divides the light of the intermediate wave guide 13 into two wave guides 18 and 19 which have optical paths of equal length so that light transmitted through them is combined again at an output combining device 20 with the same phase and from there is guided to the output wave guide 21. If the current now flows through the heating conductor 22, the index of refraction in the vicinity of the wave guide 18 changes while that in the vicinity of wave guide 19 remains unchanged. Because of that the interferometer is detuned and, according to the degree of detuning, a variable amount of the light is lost at the output combining device into the layers 3 to 5 so that the portion of the light conducted to the output wave guide 21 is reduced and so that the output light level can be changed.

Another embodiment of the level adjusting device is shown in FIG. 2. Here the intermediate wave guide 13 is connected to the output wave guide 21 by means of a single connecting wave guide 23. The wave guides 13, 23 and 21 do not necessarily have different cross-sectional areas. The connecting wave guide 23 is arranged next to a heating conductor 24 which changes the index of refraction profile so strongly with increasingly elevated temperature that a portion of the light conducted through it is decoupled into the layers 3 to 5 (cut-off modulator). The proportion of the decoupled light can also be varied by continuously varying the heating conductor current flow.

Of course by the same method larger optical switching matrices are combinable with one or more optical level adjusting device according to the invention. In the general N×M switching matrix up to N level adjusting devices can be significantly arranged at the input and also up to M level adjusting devices can be significantly arranged at the output.

Figure 3:
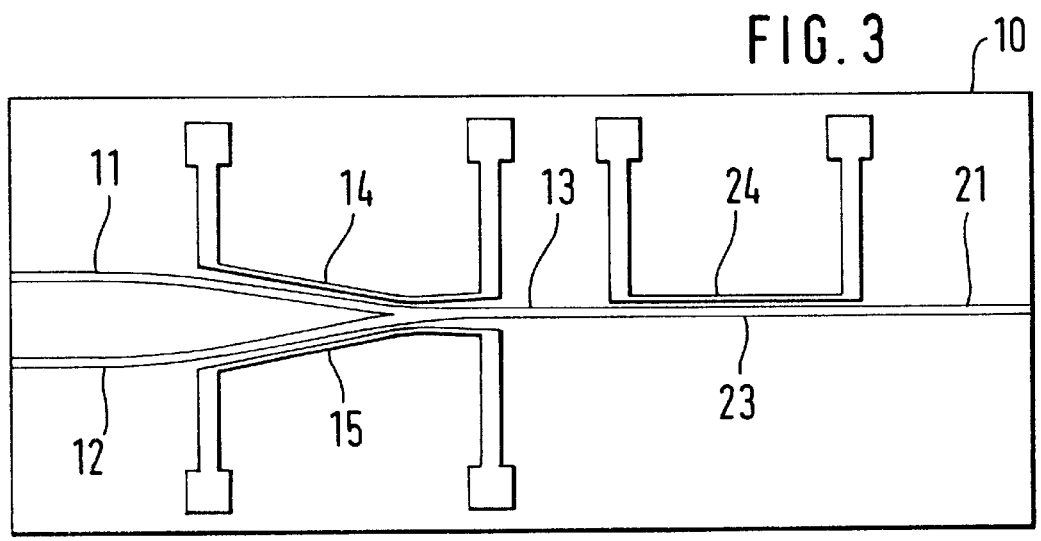
FIG. 3 is a diagrammatic representation of a second embodiment of the invention.

Finally the embodiments according to FIGS. 2 and 3 can be operated in the reverse signal flow direction, if the optical wave guide switch 11 to 15 is constructed like a controllable Y-branch, if necessary with a downstream modulator which influences the index of refraction, especially integrated in the same substrate, which is controllable so that the high throughput attentuation obtained in output arms 11, 12 is complemented by a high modulator damping.

An electrooptic modulator circuit is known from the prior art (A. Neyer and W.Sohler, Appl. Phys. Lett. 35, pp. 256 to 258, 1979), which performs ON/Off switching by changing the index of refraction (EO) in a wave guide formed in $LiNbO_3$. The index of refraction of the wave guide is changed so that the light guided in it is partially decoupled into the surrounding substrate. A high suppression may be obtained in the case of a switch off with this "cut-off modulator", when the length of the index of refraction change zone is large.

The disclosure in German Patent Application 198 09 887.1 of Mar. 7, 1998 is incorporated here by reference. This German Patent Application describes the invention described hereinabove and claimed in the claims appended hereininbelow and provides the basis for a claim of priority for the instant invention under 35 U.S.C. 119.

While the invention has been illustrated and described as embodied in an optical transmission system, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. An optical device for an optical signal transmission system, said optical device comprising
   at least one optical wave guide switch (11 to 15) for switching between at least two transmission paths for transmission of light; and
   an optical level adjusting device (16 to 24) connected in series with said at least one optical wave guide switch in at least one of said at least two transmission paths without intervening optical components;
   wherein said optical level adjusting device (16 to 24) includes means (22, 24) for thermooptic continuous adjustment of a level of the light transmittance through the optical level adjusting device;

wherein said at least one optical wave guide switch (11 to 15) includes means (14,15) for thermooptic switching between said at least two transmission paths; and wherein said at least one optical wave guide switch and said optical level adjusting device are arranged in an integrated thermooptic circuit in a common substrate.

2. The optical signal transmission system as defined in claim 1, wherein said at least one optical wave guide switch (11 to 15) is a changeover switch.

3. The optical signal transmission system as defined in claim 1, wherein the at least one optical wave guide switch (11 to 15) has only one output (13) but has a plurality of inputs (11,12) and said optical level adjusting device (16 to 24) is connected to said output (13) downstream of said at least one optical wave guide switch (11 to 15).

4. The optical signal transmission system as defined in claim 1, wherein said at least one optical wave guide switch (11 to 15) is connected downstream of said optical level adjusting device (16 to 24) and is a thermooptic branching device having only one input (13) and a plurality of outputs (11,12).

5. The optical signal transmission system as defined in claim 1, wherein the light transmitted over said at least one transmission path varies over a predetermined intensity range and said optical level adjusting device (16 to 24) has a light level adjustment range for the proportion of the light passed through the optical level adjusting device that is adjusted to fit the predetermined intensity range.

6. The optical device as defined in claim 1, wherein said optical level adjusting device (16 to 24) is a thermooptically tunable Mach-Zehnder interferometer.

* * * * *